(12) United States Patent
Wright et al.

(10) Patent No.: US 9,191,587 B2
(45) Date of Patent: Nov. 17, 2015

(54) METHOD AND APPARATUS FOR IMAGE STACKING

(71) Applicant: Raytheon Company, Waltham, MA (US)

(72) Inventors: Richard J. Wright, Tucson, AZ (US); William R. Owens, Tucson, AZ (US); Gregory E. Longerich, Oro Valley, AZ (US); Andrew F. Varecka, Tucson, AZ (US); Perry H. Frahm, Tucson, AZ (US); David C. Robillard, Tucson, AZ (US); Emerald J. Adair, Vail, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 415 days.

(21) Appl. No.: 13/661,651

(22) Filed: Oct. 26, 2012

(65) Prior Publication Data

US 2014/0118514 A1     May 1, 2014

(51) Int. Cl.
*H04N 5/232* (2006.01)
*H04N 5/33* (2006.01)

(52) U.S. Cl.
CPC ........... *H04N 5/332* (2013.01); *H04N 5/23232* (2013.01)

(58) Field of Classification Search
None
See application file for complete search history.

(56) References Cited

U.S. PATENT DOCUMENTS

| | | | |
|---|---|---|---|
| 5,841,574 A * | 11/1998 | Willey | 359/351 |
| 7,199,348 B2 * | 4/2007 | Olsen et al. | 250/208.1 |
| 7,714,262 B2 * | 5/2010 | Olsen et al. | 250/208.1 |
| 7,822,263 B1 * | 10/2010 | Prokoski | 382/152 |
| 8,326,142 B2 * | 12/2012 | Kravitz et al. | 396/333 |
| 2003/0174315 A1 * | 9/2003 | Byren et al. | 356/152.1 |
| 2004/0119020 A1 * | 6/2004 | Bodkin | 250/353 |
| 2006/0054782 A1 * | 3/2006 | Olsen et al. | 250/208.1 |
| 2007/0003155 A1 * | 1/2007 | Miller et al. | 382/254 |
| 2009/0148065 A1 | 6/2009 | Halsted | |
| 2009/0284644 A1 * | 11/2009 | McKaughan et al. | 348/348 |
| 2012/0105635 A1 * | 5/2012 | Erhardt et al. | 348/148 |
| 2012/0209741 A1 * | 8/2012 | Bonner et al. | 705/26.3 |

OTHER PUBLICATIONS

Nelan, Edmund et al., "The Fine Guidance Sensors Aboard the Hubble Space Telescope, the Scientific Capabilities of these Interferometers", SPIE Conference on Astronomical Interferometry. vol. 3350, Mar. 1998.

* cited by examiner

*Primary Examiner* — Jay Patel
*Assistant Examiner* — Reza Aghevli
(74) *Attorney, Agent, or Firm* — Lando & Anastasi, LLP

(57) ABSTRACT

An optical imaging system and method in which a second channel is used to provide alignment data for achieving image frame stacking of image data in a first channel. In one example, image stacking of infrared images is achieved by obtaining and analyzing corresponding visible images to provide alignment data that is then used to align and stack the infrared images.

16 Claims, 7 Drawing Sheets

METHOD AND APPARATUS FOR IMAGE STACKING

BACKGROUND

Imaging sensors frequently encounter low intensity objects where the signal-to-noise ratio is too low for the sensor to obtain sufficient resolution of the object in a single image frame. Accordingly, multiple image frames may be stacked or summed to increase the signal-to-noise ratio and obtain a higher quality image. For example, U.S. Pre-Grant Publication No. 2009/0148065 discloses that CCD (charge-coupled device) cameras, which can be coupled to telescopes for astrophotography, are capable of acquiring multiple images over many seconds and stacking them into a single image. U.S. Pre-Grant Publication No. 2009/0148065 further describes a method whereby images from a plurality of telescopes (or other imaging systems) are combined in real time, effectively constructing image stacks by combining images from a plurality of input sources simultaneously. This method may provide the benefits of a large image stack in a much shorter amount of time than is taken to collect and stack images acquired with a CCD still or video camera mounted on a single telescope.

However, where image frames collected from a single camera over time are stacked, any camera motion between frames blurs the resulting composite image. In addition, independent frame to frame alignment information is required to perform successful frame stacking. For example, inertial sensors (e.g., an inertial measurement unit (IMU)) coupled to the image sensor may provide motion data that can be used to register frames; however, the IMU precision is generally insufficient for accurate frame alignment. Cross-correlation alignment may be used in some circumstances, for example, if the image frames have sufficiently defined points; however, image stacking often may be desired where there are no or an insufficient number of sufficiently defined points available, and poor signal-to-noise ratio in the imaging sensor can prevent cross-correlation adjustment of frames.

SUMMARY OF INVENTION

Aspects and embodiments are directed to methods and apparatus for frame stacking using a reference imaging sensor to provide frame alignment information for a primary imaging sensor. According to one example, the reference imaging sensor uses independent types of observations in the same environment as the primary imaging sensor to produce the alignment data. For example, as discussed in more detail below, the primary and reference imaging sensors may be configured to image in different spectral bands.

According to one embodiment, an imaging system comprises a primary imaging sensor configured to detect electromagnetic radiation in a first spectral band and to produce first image data comprising a plurality of image frames, a secondary imaging sensor configured to detect electromagnetic radiation in a second spectral band, different from the first spectral band, and to produce second image data time-synchronized with the first image data, a computation module coupled to the secondary imaging sensor and configured to analyze the second image data and produce alignment data, and an alignment module coupled to the primary imaging sensor and to the computation module, and configured to receive the alignment data and the first image data and to align and stack the plurality of image frames to produce an aligned image stack.

In one example of the imaging system the first spectral band is an infrared spectral band. In another example the second spectral band is a visible spectral band. The imaging system may further comprise a primary telescope optically coupled to the primary imaging sensor and configured to direct the electromagnetic radiation in the first spectral band to the primary imaging sensor. The imaging system may further comprise a secondary telescope optically coupled to the secondary imaging sensor and configured to direct the electromagnetic radiation in the second spectral band to the secondary imaging sensor. In one example the primary telescope and the secondary telescope are aligned along a common boresight. In another example an optical axis of the secondary telescope is offset with respect to an optical axis of the primary telescope, and the computation module is configured to correct the alignment data to compensate for the offset and to provide corrected alignment data to the alignment module. In another example the imaging system further comprises a telescope configured to receive and collimate incident electromagnetic radiation, and a beamsplitter optically coupled to the telescope and configured to spectrally separate the incident electromagnetic radiation into the first spectral band and the second spectral band. The imaging system may further comprise a receiving system coupled to the alignment module and configured to receive the aligned image stack.

According to another embodiment a method of image stacking comprises obtaining first image data in a first spectral band, the first image data including a first plurality of image frames, synchronously obtaining second image data in a second spectral band, different from the first spectral band, analyzing the second image data to produce alignment data, and applying the alignment data to the first image data to align and stack the first plurality of image frames to produce an aligned image stack.

In one example of the method obtaining the first image data includes obtaining the first image data in an infrared spectral band. In another example obtaining the second image data includes obtaining the second image data in a visible spectral band. The method may further include applying a common frame trigger signal to a first imaging sensor configured to obtain the first image data and to a second imaging sensor configured to obtain the second image data. In one example, in which the second image data includes a second plurality of image frames synchronized in time with the first plurality of image frames, and analyzing the second image data includes determining frame to frame offsets of at least one reference object within each frame of the second plurality of frames. In one example analyzing the second image data further includes calculating a centroid of the at least one reference object, and calculating frame to frame movement of the centroid. The method may further comprise displaying the aligned image stack.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

In many circumstances where an imaging sensor may have low signal-to-noise ratio, for example, when imaging distant or low-intensity objects, or imaging in low-light conditions, it may be desirable to combine multiple image frames to obtain better resolution of the object. For example, repeated image frames of a scene may be taken, and aligned and then "stacked" or summed to produce a higher resolution composite image. However, conventional methods of image stacking suffer from various disadvantages or limitations. For example, inertia-based image stacking, in which inertial measurements of the imaging sensor's position may be used to infer frame to frame alignment changes, requires precise information regarding the pointing direction of the imaging sensor to be known in order to constructively add data from multiple frames. Thus, the alignment precision (accuracy) is limited by the associated inertial measurement unit. Furthermore, frame to frame alignment may be more difficult when the individual image frames do not contain reference information, such as identifiable background objects, to indicate proper alignment. U.S. Pre-Grant Publication No. 2009/0148065 describes stacking images obtained from multiple imaging sensors into a single frame; however, in order to accomplish successful stacking each image must be sufficiently resolved to permit registration of the separate images/frames. Accordingly, this method fails where the individual images lack sufficient resolution due to poor signal-to-noise ratio, for example.

Figure 1:
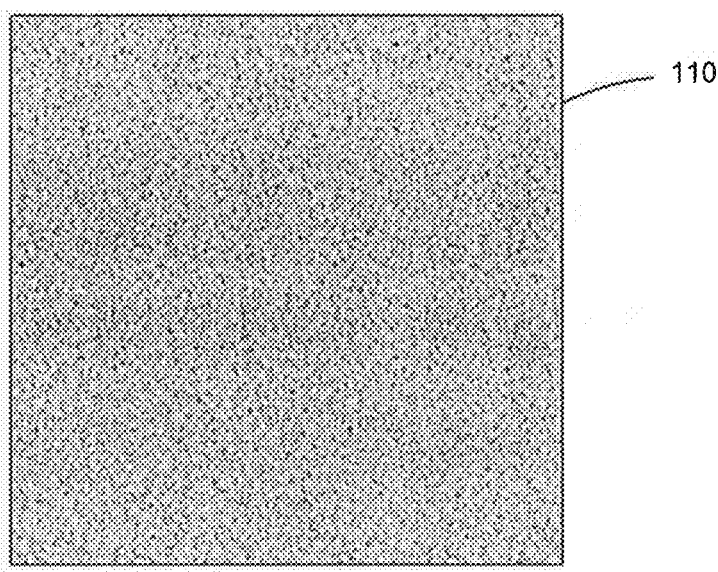
FIG. 1 is an example of an image frame obtained from a primary infrared imaging sensor.

According to certain embodiments, a primary imaging sensor may be an infrared sensor used to produce images in the infrared spectral region. In certain examples the primary imaging sensor may be configured for imaging in any one or more of the near infrared (NIR; e.g., 0.5-1.0 µm), shortwave infrared (SWIR; e.g., 1-3 µm), midwave infrared (MWIR; e.g., 3-8 µm), longwave infrared (LWIR; e.g., 8-12 µm) and/or very longwave infrared (VLIR e.g., 12-30 µm) spectral bands. In other examples, the primary imaging sensor may be configured for imaging in other spectral bands, such as the millimeter-wave or radio frequency (RF) bands. Furthermore, as discussed above, in certain applications, it may be desirable to use the primary imaging sensor to image a distant object that is therefore very faint (low intensity). Increasing the exposure time for each image frame may increase the overall intensity for the frame; however, there are practical limits on the length of exposure time due to motion of the platform and/or object being imaged. As a result, individual image frames obtained by the primary imaging sensor may contain no detectable or resolvable object. Therefore, conventional image-based image stacking techniques, which require a resolved object in each frame for frame to frame alignment, may be unusable. In addition, since the primary imaging sensor is imaging in the infrared, or other "non-visible," spectral band, there may be no visible objects or features within individual frames to allow for frame to frame alignment. FIG. 1 illustrates an example of an image frame 100 which may be produced by an infrared primary imaging sensor. As can be seen with reference to FIG. 1, there may be nothing present within the individual frames from the primary imaging sensor to allow alignment of multiple frames to achieve successful image stacking using conventional techniques.

Figure 2:
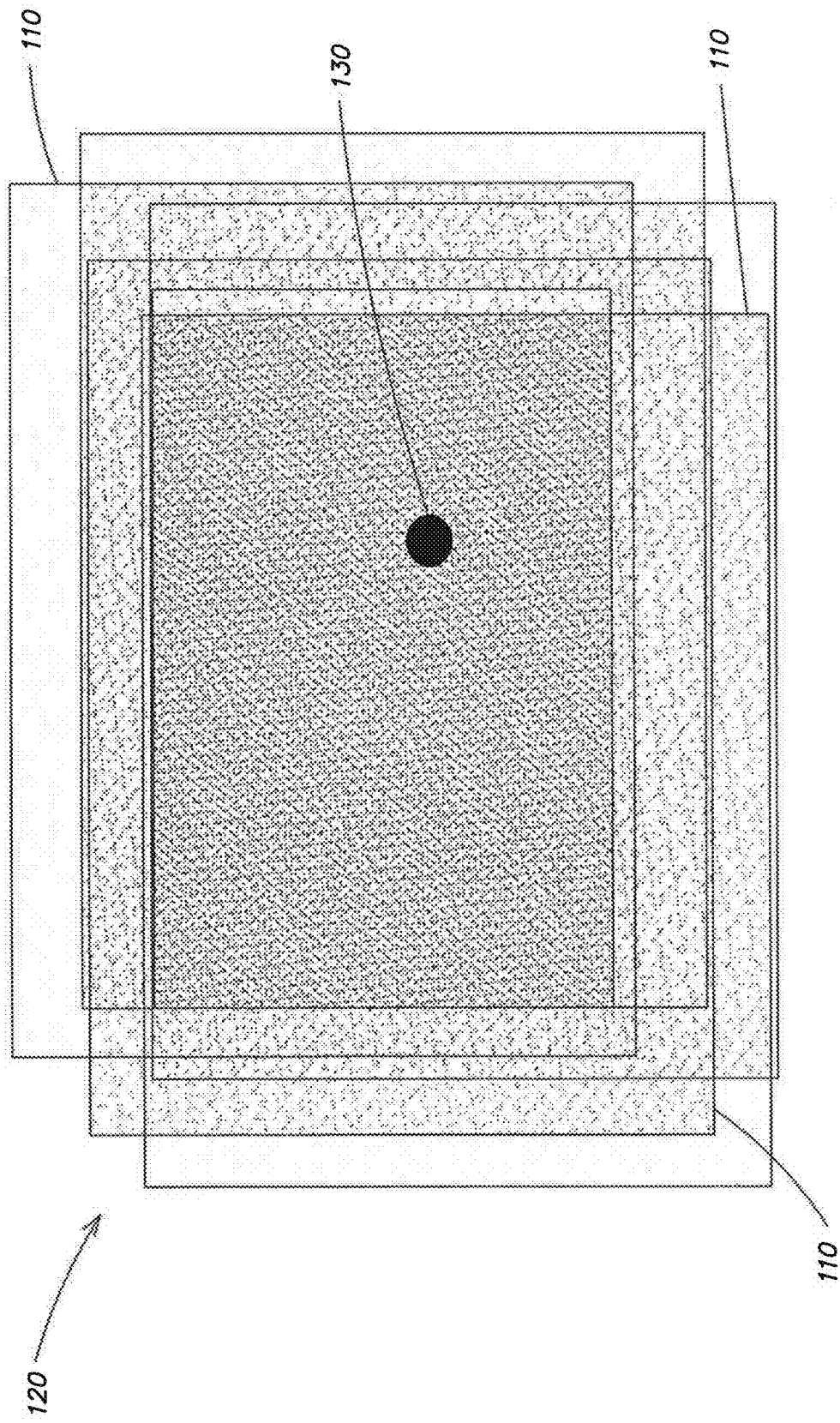
FIG. 2 is an illustration of multiple image frames aligned and summed to produce an imaging having a higher signal to noise and revealing an object of interest according to aspects of the invention.

However, if image stacking can be achieved, an object of interest may be resolved in the composite ("stacked") image, as shown, for example, in FIG. 2. As discussed above, repeated frames 110 of the scene may be aligned and summed, producing an image stack 120. Real objects 130 in the field are enhanced as they constructively add up in the image stack 120. In contrast, temporal noise is random, and therefore noise artifacts in the image frames are suppressed because they do not repeat in the image stack and therefore do not constructively add up. The improvement in image resolution is proportional to the square root of the number of frames. Thus, it may be very desirable to achieve image stacking of infrared (or other) image frames in applications and/or circumstances where individual frames may not contain sufficient information for self-alignment and conventional image stacking techniques are inadequate.

Aspects and embodiments provide an imaging system and method in which a secondary or reference imaging sensor is configured to effectively "see" or image a reference field with a fixed alignment relative to a primary imaging sensor to provide pointing data which may be used to align multiple image frames from the primary imaging sensor to produce a composite image. In particular, aspects and embodiments provide a mechanism by which to align images that individually do not contain any sufficiently resolved objects to be used for alignment. As discussed in more detail below, the second imaging sensor is configured with a defined "anchor point" and used to determine interframe motion of the primary imaging sensor. In one embodiment in which the imaging sensors are installed on a mobile platform, such as a spacecraft or vehicle, for example, the secondary imaging sensor is rigidly fixed to the primary imaging sensor such that both sensors experience the same platform motion. By taking reference images coincident with the primary images, frames from the primary imaging sensor may be aligned by measuring offsets in the reference images and applying these offsets to the frames taken in the primary sensor, as discussed further below. Thus, primary imaging sensors with limitations which prevent them from providing their own alignment data may be provided with accurate information from a separate channel (the secondary imaging sensor) to produce image stacks sufficiently deep to overcome single-frame performance shortcomings of the primary imaging sensor.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 3:
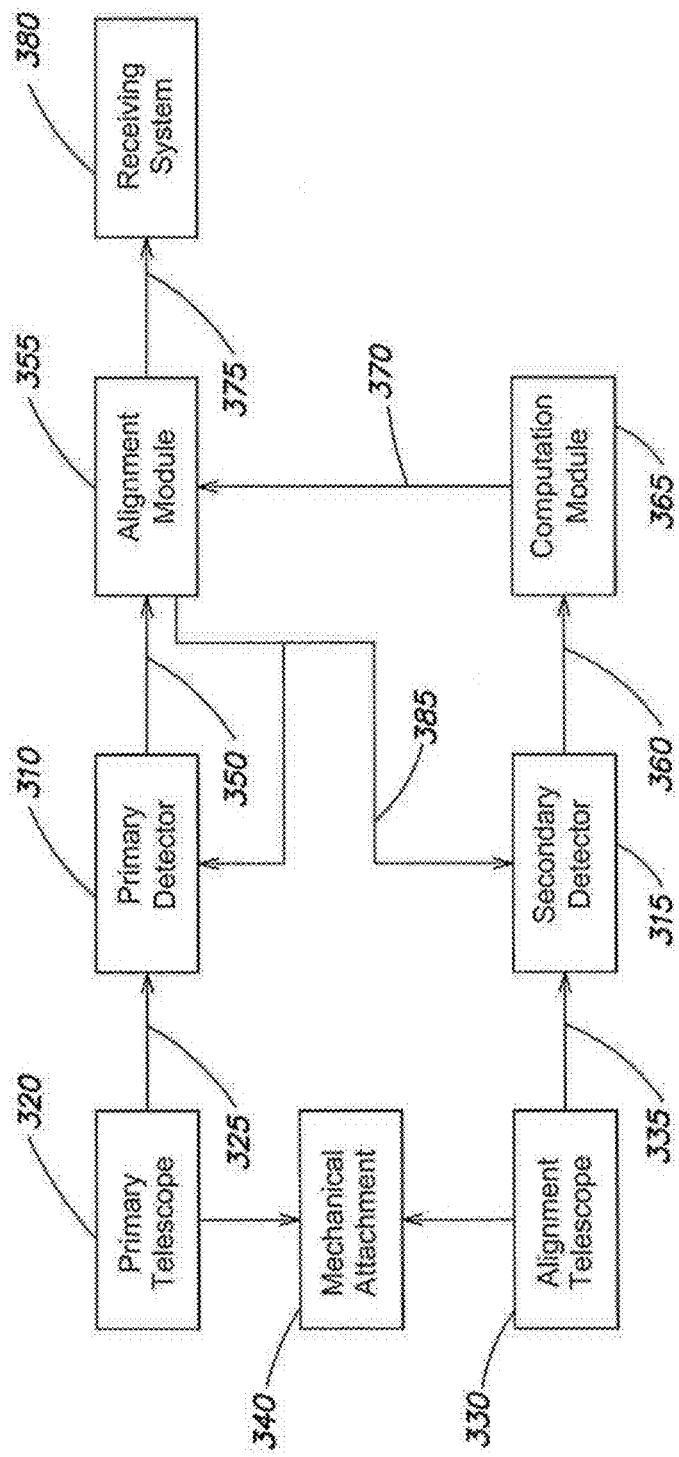
FIG. 3 is a block diagram of one example of an imaging system according to aspects of the invention.

Referring to FIG. 3 there is illustrated a block diagram of one example of an imaging system according to one embodiment. The imaging system may be mounted to a mobile platform (not shown), such as a vehicle or satellite, for example. The imaging system includes a primary imaging sensor 310 and a secondary imaging sensor 315 (also referred to as an alignment imaging sensor). In one embodiment, electromagnetic radiation may be directed to each of the primary imaging sensor and the secondary imaging sensor by separate optical systems. For example, as shown in FIG. 3, a primary telescope 320 is configured to direct electromagnetic radiation 325 to the primary imaging sensor 310 (also referred to as a primary detector), and an alignment telescope 330 is configured to direct electromagnetic radiation 335 to the secondary imaging sensor 315 (also referred to as a secondary detector). However, it is to be appreciated that other configurations may be implemented, and various embodiments are not limited to the use of separate telescopes or other optical systems for the two imaging sensors. For example, a common optical system coupled to a beamsplitter may be used to direct incoming electromagnetic radiation to the imaging sensors, as discussed further below. A mechanical attachment mechanism 340 is used to couple the primary telescope 320 and the alignment telescope 330 together such that any platform motion is the same for either telescope, and any motion experienced by one telescope is similarly experienced by the other. In this manner, independent motion of the telescopes and/or imaging sensors that could disrupt the alignment data provided by the secondary imaging sensor 315 is prevented. Each of the primary and secondary telescope 320, 330 may include an arrangement of mirrors and/or lenses configured to accept and collimate incoming electromagnetic radiation and to focus the collimated electromagnetic radiation onto the respective imaging sensor.

The primary imaging sensor 310 produces primary image data 350 which is provided to an alignment module 355. The secondary imaging sensor 315 produces secondary image data 360 which is provided to a computation module 365. According to one embodiment, the computation module 365 calculates the frame to frame movement and provides alignment data 370 to the alignment module 355, where it is used to align new image data with previous summed frames of the primary image data 350 to allow the frames to be stacked to produce aligned image stacks 375. The aligned image stacks 375 produce a composite, higher resolution image which may be provided to and used by a receiving system 380. The characteristics and/or purpose of the receiving system 380 may vary depending on the application of the imaging system. For example, in camera or photography applications, the receiving system 380 may include, or may be coupled to, a processor and/or display device to allow a user to view and analyze the high resolution image stacks 375. In guidance or tracking applications, for example, missile detection systems, the receiving system 380 may include a guidance system that analyzes the image stacks 375 to detect and track objects, such as missiles.

It is to be appreciated that although the computation module 365 and the alignment module 355 are illustrated as separate blocks in FIG. 3, these elements are not necessarily separate physical components and may be combined or may be implemented using a common processor, computer, or other computing device.

Still referring to FIG. 3, in one embodiment, a common frame trigger signal 385 is provided to both the primary imaging sensor 310 and the secondary imaging sensor 315 such that both sensors obtain image frames at the same time. Since the integration time of the different sensors may be different, the frame trigger signal should be centered in their integration time. This arrangement simplifies the processing performed by the computation module 365 and/or alignment module 355 to align the frames of the primary image data 350 to produce the aligned image stacks 375. In one example the common frame trigger signal 385 is provided by the alignment module 355, as shown in FIG. 3. However, in other examples the frame trigger signal 385 may be provided by other components of the imaging system, such as the computation module 365 or receiving system 380, or by a separate clock distribution and control module (not shown). In one example, the common frame trigger signal 385 is configured to control operation of the integration time of the primary and secondary imaging sensors 310, 315 such that the centers of the integration periods of each sensor (akin to the center position of the shutter in a typical camera system) are synchronized in time.

As discussed above, in one example, the primary imaging sensor 310 is an infrared sensor configured to produce images in any of the NIR, SWIR, MWIR, LWIR and/or VLWIR spectral bands. In other examples the primary imaging sensor may be any other type of radiation detector, including for example, a visible sensor, ultraviolet sensor, RF sensor, millimeter-wave sensor, and the like. According to one embodiment, the secondary imaging sensor 315 is configured to image in a different spectral band than the primary imaging sensor. For example, the secondary imaging sensor 315 may be configured to image in the visible band. In addition, in some embodiments, the secondary imaging sensor 315 may be a higher resolution sensor than the primary imaging sensor 310. Thus, the secondary imaging sensor 315 may be able to obtain images that contain visible features and/or are sufficiently resolved to be used to produce the alignment data 370 which may then be used to align the corresponding image frames from the primary imaging sensor 310.

Figure 4:
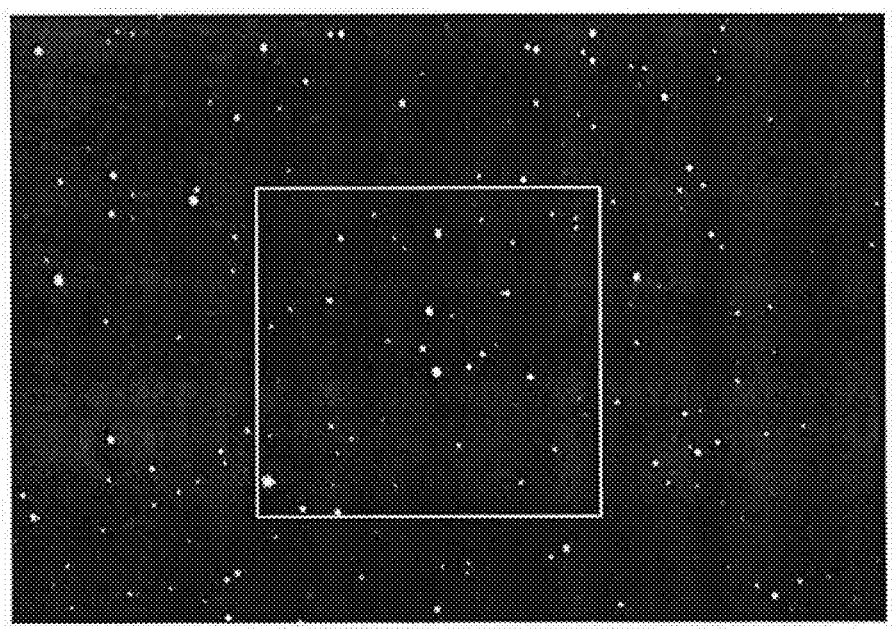
FIG. 4 is a an illustration of a secondary image frame overlaid on a reference scene according to aspects of the invention.

In one embodiment, the secondary imaging sensor may be configured to image a general background or reference scene. For example, particularly where the imaging system may be mounted on a spacecraft, the secondary imaging sensor may be configured to image a background star field, as illustrated in FIG. 4. In one example, the reference scene may contain one or more reference objects, such as brighter stars in the example illustrated in FIG. 4. These objects may be used to calculate frame to frame offsets, and thus calculate the alignment data 370. In the example of a background star field, some or all of the visible stars collectively may be used to calculate the alignment data, without the need necessarily for any one or more stars to be resolved objects in the image frames. In one example, an object or cluster of objects in the scene may be designated an "anchor point," and the secondary imaging sensor may be directed to focus with the anchor point in a predetermined location within an initial image frame, for example, in the center of a first frame of a sequence of frames. Frame to frame movement of the object or cluster of objects may then be used to calculate the alignment data. For example, the centroid of the object or cluster of objects may be calculated in each image frame, and offsets of centroid from one frame to another may be used to determine the alignment data.

Figure 5:
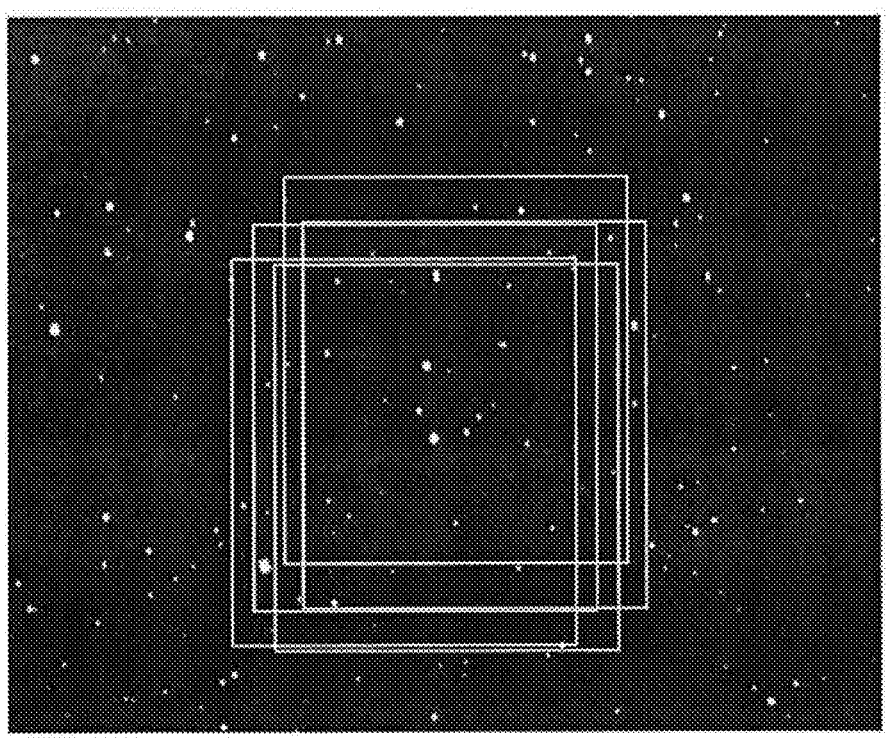
FIG. 5 is an illustration of a plurality of secondary image frames aligned and super-imposed on the background scene of FIG. 4.

FIG. 5 illustrates a plurality of secondary or reference image frames aligned and super-imposed on the background scene. These frames may correspond to (and be time synchronized with) primary image frames taken by the primary imaging sensor 315, as discussed above. Accordingly, the alignment data 370 calculated using the secondary image data 360 may be used to align and stack the frames of the primary image data to produce the image stack 375, as illustrated in FIG. 2, for example. According to one embodiment, adding a visible channel (the secondary imaging sensor and associated processing) to an infrared imaging system may enable robust and precise anchor-point-based image stacking since the visible image data may contain information not present in the infrared image data, and which may be used to calculate the alignment data, as discussed above. In addition, in one example, the secondary (e.g., visible) image data may processed to provide information to determine frame usability before stacking of the primary (e.g., infrared) image frames. For example, analyzing the secondary image data may reveal frames that are blurry due to platform motion. Since the secondary image frames may be time-synchronized with the primary image frames, blurred secondary image frames may indicate a likelihood that the corresponding primary image frames are also blurry, and these frames may be discarded and not used in the image stack 375. This may allow a higher resolution image stack 375 to be created by discarding image frames that would negatively impact the image stack.

In one embodiment the secondary telescope 330 and secondary imaging sensor 315 may be aligned along approximately a same line-of-sight as the primary telescope 320 and primary imaging sensor 310. Thus, the primary and secondary imaging sensors may have a common boresight. The alignment data 370 may be corrected for the true boresight of the imaging system. In other examples, however, it may be desirable to have the primary imaging sensor 310 and the secondary imaging sensor 315 pointed in different directions or at different anchor points. For example, it may be desirable to point the primary imaging sensor 310 in a direction where, in the spectral band of the secondary imaging sensor there is an object or source of noise that would degrade the usefulness of the secondary image data as alignment data. For example, it may be desirable to obtain an infrared image with the infrared (primary) imaging sensor pointing near to something visually bright which although may not interfere with the infrared imaging, may blind the visible (secondary) imaging sensor. Accordingly, it may be preferable to point the secondary imaging sensor somewhere else.

Figure 6:
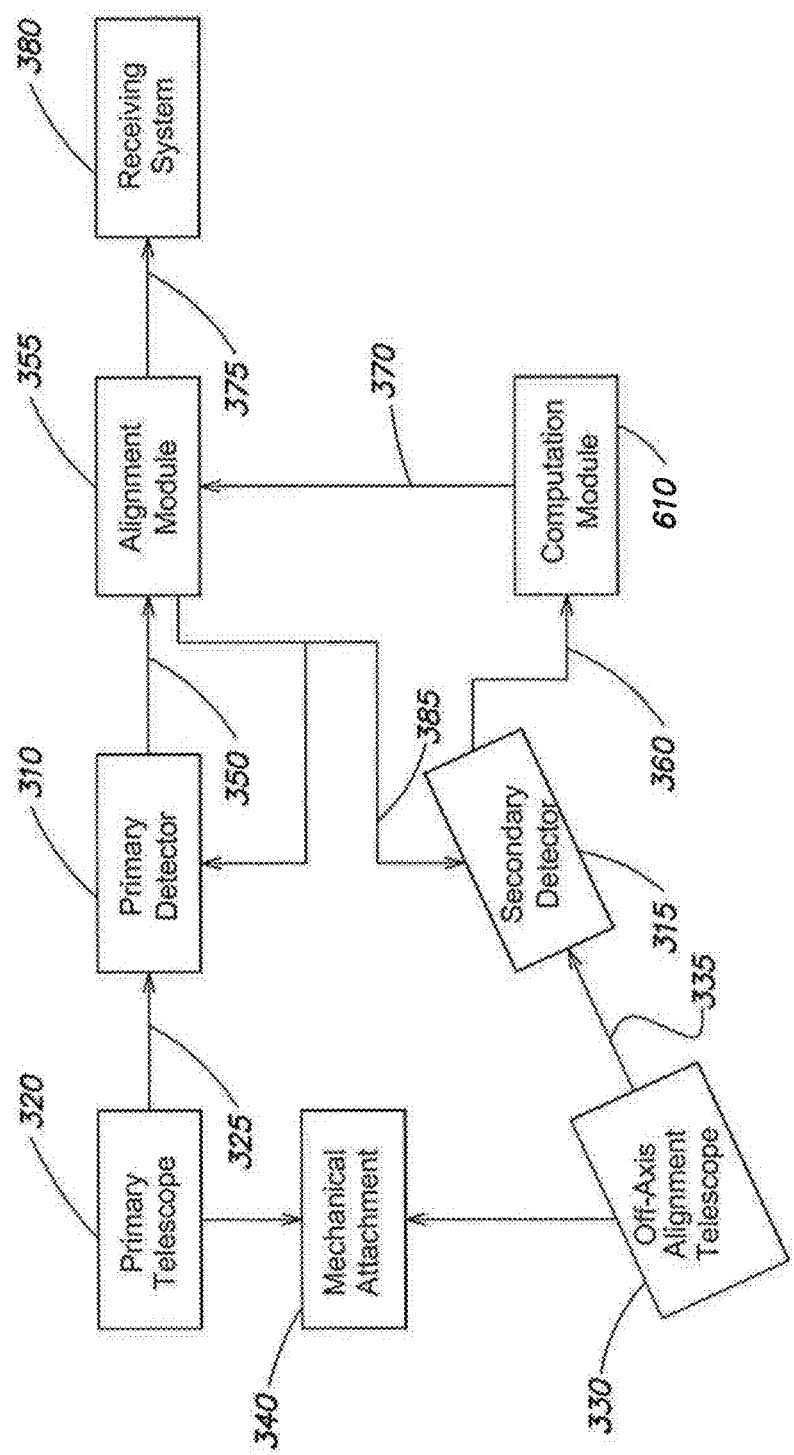
FIG. 6 is a block diagram of another example of an imaging system according to aspects of the invention.

FIG. 6 illustrates an example of an imaging system, similar to the system of FIG. 3, but where the primary imaging sensor 310 and secondary imaging sensor 315 do not share a common boresight. Instead, the secondary imaging sensor 315 and alignment telescope 330 may be mounted off-axis with respect to the primary telescope 320 and primary imaging sensor 310, but with a known offset or relationship. Furthermore, as discussed above, the primary and secondary telescopes may be fixedly secured to the platform and/or to each other to ensure that there is very little or no movement of the boresights with respect to one another and that platform motion is common to both imaging channels. In one example, the computation module 610 may be further configured to perform coordinate conversion to compensate for the offset in optical axes between the primary imaging channel and the secondary imaging channel, such that the alignment data provided to the alignment module is corrected for the true boresight of the primary imaging channel.

Figure 7:
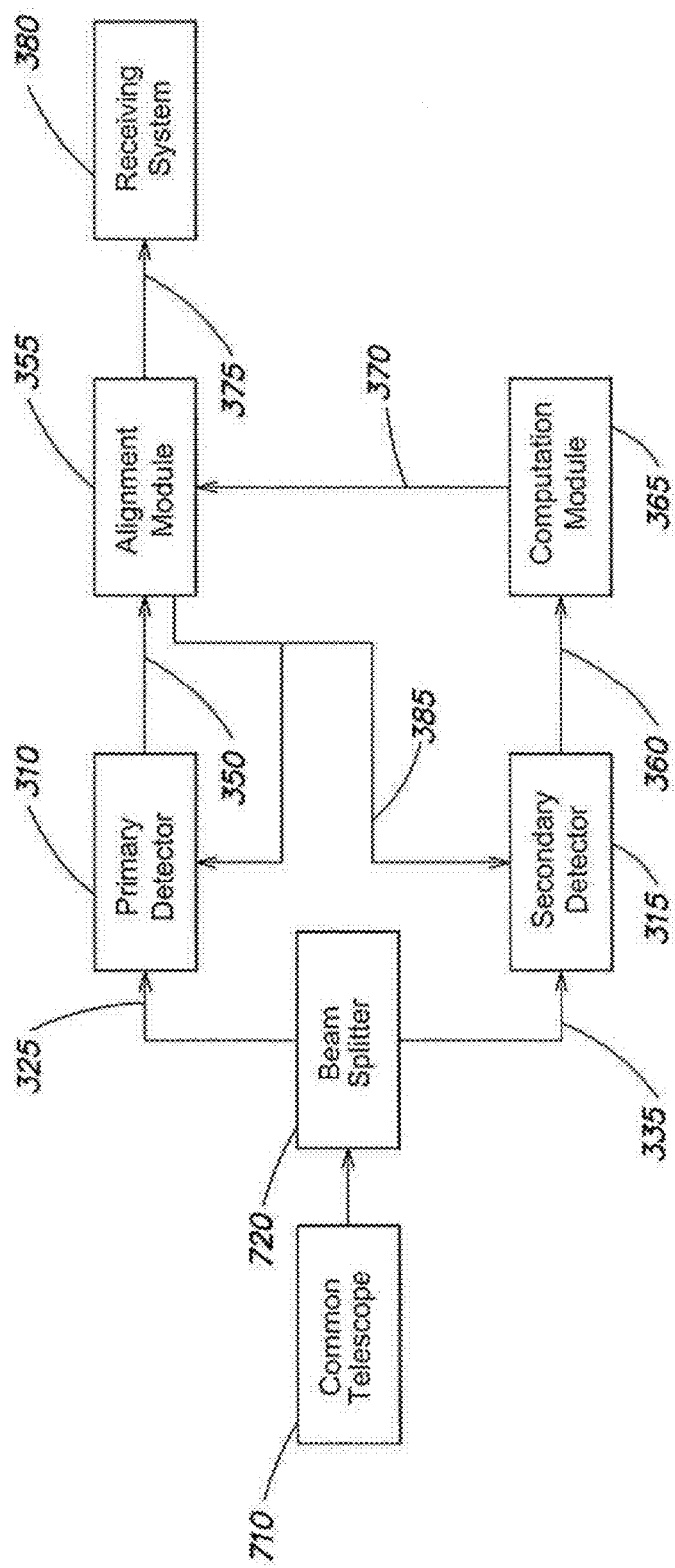
FIG. 7 is a block diagram of another example of an imaging system according to aspects of the invention.

In some embodiments it may be preferable to have a separate optical path for each of the primary imaging sensor 310 and secondary imaging sensor 315, as illustrated in FIGS. 3 and 6. For example, the optical components (e.g., mirrors, lenses, etc.) in each path may be selected and optionally optimized specifically for the spectral band of the associated imaging detector. However, according to other embodiments, the imaging system may use a common telescope (or other optical sub-system) to direct incident electromagnetic radiation onto the primary and secondary imaging sensors 310, 315. An example of such an arrangement is illustrated in FIG. 7. In the illustrated example, a common telescope 710 accepts and collimates incoming electromagnetic radiation in the spectral bands corresponding to both imaging detectors. A beamsplitter 720 is used to split the incident electromagnetic radiation into the two spectral bands, and direct each band to the appropriate imaging detector. It is to be appreciated that various other optical components, such as fold mirrors, lenses etc. that may complete the optical path(s) may be included although not shown in FIG. 7.

In any of the above-discussed embodiments and examples, the primary and second imaging sensors 310, 315 may be separate detectors, optionally single-band detectors, configured for their respective spectral bands. This arrangement may have advantages in that the infrared sensor may be cooled within a cryogenic cooler, and/or the channel processing may be optimized for each detector and spectral band. However, in some embodiments, particularly, for example, the configuration illustrated in FIG. 7, an integrated dual-band imaging detector may be used to implement both the primary and secondary imaging sensors in a common component. In this example, a common telescope 710 may be used to direct the incoming electromagnetic radiation, and the beamsplitter may either be omitted, or may be used to direct the different spectral bands to different areas of the integrated detector.

Various examples discussed above refer to configurations in which the primary imaging sensor 310 is an infrared sensor, and the secondary imaging sensor 315 is a visible sensor. However, numerous other configurations may be implemented. For example, each of the primary and secondary imaging sensors 310, 315 may be any type of radiation sensor, and/or configured to image in any spectral band, including, but not limited to, infrared, visible, ultraviolet, RF, millimeter-wave, X-ray, or gamma ray. Alignment data from a secondary imaging sensor imaging in a different spectral band may be used to allow a primary imaging sensor to integrate data between separate primary data frames without having alignment references visible in those primary data frames, independent of the spectral band used by either the primary or secondary imaging sensors. In certain examples it may be desirable to select complimentary primary and secondary imaging sensors in terms of the characteristics of the imaging environments, the size of the optical systems, and/or the platform on which the optical systems are to be accommodated. For example, as discussed above, it may be advantageous to align frames from a primary infrared imaging sensor using visible light in the case of an infrared background where there are few usable stars (for alignment purposes), whereas a visible light sensor has plentiful alignment targets. Infrared, visible and or ultraviolet channels (including the imaging sensors and associated telescopes or other optical systems) may be relatively similar in size, and therefore in certain examples it may be desirable to pair these types of channels together. However, in other examples, the configuration of the platform may accommodate the use of primary and secondary channels that are different in size, such as an infrared, visible or ultraviolet primary channel paired with an RF alignment channel, which may be physically very large in comparison to the primary channel.

Thus, aspects and embodiments may provide a method of image stacking in which a second channel may be used to provide the alignment data needed to achieve successful stacking of image frames taken with a primary channel. This arrangement allows primary imaging sensors with limitations which prevent them from providing their own alignment data to produce image stacks sufficiently deep to overcome single-frame performance shortcomings of the primary imaging sensor. In addition, the alignment data calculated to achieve the frame alignment and image stacking inherently contains very fine or precise pointing information of the boresight(s) of the imaging system. This information may provide feedback to an inertial measurement unit or other pointing/tracking system associated with the imaging system or its platform to enhance pointing or tracking of the system/platform. Aspects and embodiment of the techniques discussed herein may be applicable and useful in a wide variety of imaging applications, including, for example, photography applications, tracking or guidance applications, and/or medical applications, such as narrow spectral band imagery of neoplastic tissue areas (in which frame stacking is useful to overcome low signal-to-noise ratio and live patients induce frame to frame motion), and the like.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An imaging system comprising:
   a primary imaging sensor configured to detect electromagnetic radiation in a first spectral band and to produce first image data comprising a plurality of image frames captured over a period of time;
   a primary telescope optically coupled to the primary imaging sensor and configured to direct the electromagnetic radiation in the first spectral band to the primary imaging sensor;
   a secondary imaging sensor configured to detect electromagnetic radiation in a second spectral band, different from the first spectral band, and to produce second image data time-synchronized with the first image data;
   a secondary telescope optically coupled to the secondary imaging sensor and configured to direct the electromagnetic radiation in the second spectral band to the secondary imaging sensor, an optical axis of the secondary telescope being offset with respect to an optical axis of the primary telescope;
   a computation module coupled to the secondary imaging sensor and configured to analyze the second image data, produce alignment data, correct the alignment data to compensate for the offset, and provide corrected alignment data; and
   an alignment module coupled to the primary imaging sensor and to the computation module, and configured to receive the corrected alignment data from the computation module and the first image data from the primary imaging sensor, to align the plurality of image frames based on the corrected alignment data to produce an aligned plurality of image frames, and sum the aligned plurality of image frames to produce an aligned image stack.

2. The imaging system of claim 1, wherein the first spectral band is an infrared spectral band.

3. The imaging system of claim 2, wherein the second spectral band is a visible spectral band.

4. The imaging system of claim 1, further comprising a receiving system coupled to the alignment module and configured to receive the aligned image stack.

5. A method of image stacking comprising:
   obtaining first image data in a first spectral band, the first image data including a first plurality of image frames captured over a period of time;
   synchronously obtaining second image data including a second plurality of image frames synchronized in time with the first plurality of image frames in a second spectral band, different from the first spectral band;
   analyzing the second image data to produce alignment data including determining frame to frame offsets of at least one reference object within each frame of the second plurality of frames by calculating a centroid of the at least one reference object and calculating frame to frame movement of the centroid;
   applying the alignment data to the first image data to align the first plurality of image frames to produce an aligned first plurality of images; and
   summing the aligned first plurality of images to produce an aligned image stack.

6. The method of imaging stacking of claim 5, wherein obtaining the first image data includes obtaining the first image data in an infrared spectral band.

7. The method of imaging stacking of claim 5, wherein obtaining the second image data includes obtaining the second image data in a visible spectral band.

8. The method of imaging stacking of claim 5, further including applying a common frame trigger signal to a first imaging sensor configured to obtain the first image data and to a second imaging sensor configured to obtain the second image data.

9. The method of imaging stacking of claim 5, further comprising displaying the aligned image stack.

10. An imaging system comprising:
    a primary imaging sensor configured to detect electromagnetic radiation in a infrared band, and to capture a first plurality of image frames over a period of time;
    a secondary imaging sensor configured to detect electromagnetic radiation in a visible spectral band, and to capture a second plurality of image frames time-synchronized with the first plurality of image frames over the period of time;
    a computation module coupled to the secondary imaging sensor and configured to generate image alignment data based on the second plurality of frames at least in part by identifying at least one anchor point in each frame of the second plurality of frames and determining a frame to frame movement of the at least one anchor point in the second plurality of frames; and an alignment module coupled to the primary imaging sensor and to the computation module, and configured to receive the alignment data and the first plurality of images, to align the first plurality of image frames based on the image alignment data to produce an aligned first plurality of images, and to sum the aligned first plurality of images to produce an aligned image stack.

11. The imaging system of claim 10, further comprising a primary telescope optically coupled to the primary imaging sensor and configured to direct the electromagnetic radiation in the infrared band to the primary imaging sensor.

12. The imaging system of claim 11, further comprising a secondary telescope optically coupled to the secondary imaging sensor and configured to direct the electromagnetic radiation in the visible spectral band to the secondary imaging sensor.

13. The imaging system of claim 12, wherein the primary telescope and the secondary telescope are aligned along a common boresight.

14. The imaging system of claim 12, wherein an optical axis of the secondary telescope is offset with respect to an optical axis of the primary telescope; and
wherein the computation module is configured to correct the alignment data to compensate for the offset and to provide corrected alignment data to the alignment module.

15. The imaging system of claim 10, further comprising:
a telescope configured to receive and collimate incident electromagnetic radiation; and
a beamsplitter optically coupled to the telescope and configured to spectrally separate the incident electromagnetic radiation into the infrared band and the visible spectral band.

16. The imaging system of claim 10, further comprising a receiving system coupled to the alignment module and configured to receive the aligned image stack.

* * * * *